United States Patent [19]

Takenaka

[11] Patent Number: 5,502,638
[45] Date of Patent: Mar. 26, 1996

[54] SYSTEM FOR OBSTACLE AVOIDANCE PATH PLANNING FOR MULTIPLE-DEGREE-OF-FREEDOM MECHANISM

[75] Inventor: Toru Takenaka, Saitama, Japan

[73] Assignee: Honda Giken Kogyo Kabushiki Kaisha, Tokyo, Japan

[21] Appl. No.: 14,611

[22] Filed: Feb. 8, 1993

[30]  Foreign Application Priority Data

Feb. 10, 1992 [JP] Japan ................................. 4-057447

[51] Int. Cl.$^6$ ................................................. G06F 13/376
[52] U.S. Cl. ................................ 364/424.02; 364/424.01;
364/444; 364/449; 364/461
[58] Field of Search .......................... 364/167.01, 424.01,
364/424.02, 443, 444, 449, 461; 318/616;
395/90

[56] References Cited

U.S. PATENT DOCUMENTS

| | | | |
|---|---|---|---|
| 4,727,492 | 2/1988 | Reeve et al. | 364/424 |
| 4,764,873 | 8/1988 | Libby | 364/461 |
| 4,788,482 | 11/1988 | Tachibana et al. | 318/616 |
| 4,809,178 | 2/1989 | Ninomiya et al. | 364/443 |
| 4,862,373 | 8/1989 | Meng | 364/444 |
| 5,047,916 | 9/1991 | Kondo | 364/167.01 |
| 5,150,452 | 9/1992 | Pollack et al. | 395/90 |
| 5,170,352 | 12/1992 | McTamaney et al. | 364/424.02 |
| 5,220,508 | 6/1993 | Ninomiya et al. | 364/449 |
| 5,307,271 | 4/1994 | Everett, Jr. et al. | 364/424.02 |

OTHER PUBLICATIONS

"Collision Avoidance Control among Moving Obstacles for a Mobile Robot based on the Fuzzy Reasoning," Journal of the Robotics Society of Japan, vol. 6, No. 6, Dec., 1988.

Proceedings of the 26th IEEE Conference on Decision and Control, 9 Dec. 1987, L.A. ("Artificial potentials with elliptical isopotential contours for obstacle avoidance".

Proceedings 1990 IEEE International Conference on Robotics and Automation, 13 May 1990, Cincinati "Local obstacle avoidance for mobile robots based on the method of artificial potentials".

Proceedings of the 1991 IEEE International Symposium on Intelligent Control, 18 Dec. 1991, "an optimal control strategy for collision avoidance of mobile robots in non-stationary environments".

Werkstatistechnik, Zeitschrift fur Industrielle Fertigung, Apr. 1977, Berlin De pp. 201–205.

Primary Examiner—Kevin J. Teska
Assistant Examiner—Russell W. Frejd
Attorney, Agent, or Firm—Lyon & Lyon

[57] ABSTRACT

In a system for obstacle avoidance path finding for a multiple-degree-of-freedom mechanism such as a mobile robot moving from a starting point to a goal while avoiding obstacles. Obstacles are defined to be a virtual space having a continuous drag coefficient that increases with increasing proximity to the obstacles. A path is determined on the basis of the variational principle as the extreme for a functional such as time required for the mobile robot's movement. Since the viscous drag coefficient is greatest at the obstacles, the determined path does not go through the obstacles thereby avoiding the obstacles. Moreover, since the path is determined on the variational principle, the time required for the movement is adopted as the functional, the determined path will locally be that of minimum time.

25 Claims, 15 Drawing Sheets

Locus A

Locus B

FIG. 9

Characteristic expression for locus A

| Order of approach | 1 | 2 | 3 | 4 | 5 | 6 | 7 | 8 |
|---|---|---|---|---|---|---|---|---|
| Obstacle No. | #0 | #1 | #4 | #2 | #3 | #4 | #10 | — |
| Perigee (m) | 0.0 | 0.3 | -1.0 | -0.3 | -0.3 | 1.2 | 0.0 | — |

FIG. 10

Characteristic expression for locus B

| Order of approach | 1 | 2 | 3 | 4 | 5 | 6 | 7 | 8 |
|---|---|---|---|---|---|---|---|---|
| Obstacle No. | #0 | #1 | #4 | #2 | #3 | #4 | #10 | — |
| Perigee (m) | 0.0 | 0.25 | -1.1 | -0.35 | -0.35 | 0.9 | 0.0 | — |

FIG. 11

Characteristic expression for locus A

| Order of approach | 1 | 2 | 3 | 4 | 5 | 6 | 7 | 8 |
|---|---|---|---|---|---|---|---|---|
| Obstacle No. | #0 | #1 | #4 | #2 | #3 | #10 | — | — |
| Perigee (m) | 0.0 | 0.3 | -1.0 | -0.3 | -0.3 | 0.0 | — | — |

FIG. 12

Characteristic expression for locus A (Where the designated order of obstacle approach is #0, #2, #3, #4, #10)

| Order of approach | 1 | 2 | 3 | 4 | 5 | 6 | 7 | 8 |
|---|---|---|---|---|---|---|---|---|
| Obstacle No. | #0 | #2 | #3 | #10 | — | — | — | — |
| Perigee (m) | 0.0 | −0.3 | −0.3 | 0.0 | — | — | — | — |

FIG. 13

Characteristic expression for locus A (Where the designated order of obstacle approach is #0, #1, #4, #3, #2, #10)

| Order of approach | 1 | 2 | 3 | 4 | 5 | 6 | 7 | 8 |
|---|---|---|---|---|---|---|---|---|
| Obstacle No. | #0 | #1 | #4 | #3 | #10 | — | — | — |
| Perigee (m) | 0.0 | 0.3 | −1.0 | −0.3 | 0.0 | — | — | — |

FIG. 16

Preferable trajectory (locus) characteristics

| Order of approach | 1 | 2 | 3 | 4 | 5 | 6 | 7 | 8 |
|---|---|---|---|---|---|---|---|---|
| Obstacle No. | #0 | #2 | #3 | #4 | #10 | — | — | — |
| Perigee (m) | 0.0 | minus | minus | plus | 0.0 | — | — | — |

FIG. 20

Characteristics up to 4th in approach order

| Order of approach | 1 | 2 | 3 | 4 | 5 | 6 | 7 | 8 |
|---|---|---|---|---|---|---|---|---|
| Obstacle No. | #0 | #2 | #3 | #4 | — | — | — | — |
| Perigee (m) | 0.0 | −0.3 | 0.3 | −1.2 | — | — | — | — |

SYSTEM FOR OBSTACLE AVOIDANCE PATH PLANNING FOR MULTIPLE-DEGREE-OF-FREEDOM MECHANISM

BACKGROUND OF THE INVENTION

1. Field of the Invention

This invention relates to a system for obstacle avoidance path planning for a multiple-degree-of-freedom mechanism, and more particularly to such a system which enables quick and easy determination of the path of a multiple-degree-of-freedom mechanism such as an autonomous mobile robot or the like moving through a space including obstacles.

2. Description of the Prior Art

Obstacle avoidance is one important problem in the control of a multiple-degree-of-freedom mechanism such as an autonomous mobile robot or the like. Various proposals have been made regarding this problem, including those referred to in "Collision Avoidance Control among Moving Obstacles for a Mobile Robot based on the Fuzzy Reasoning", Journal of the Robotics Society of Japan, Vol. 6, No. 6, December, 1988.

The techniques proposed for obstacle avoidance in this and other papers can be classified into two categories: those based on the potential field method and those based on the search method. The potential field method cannot be expected to provide path optimization owing to the fact that it is difficult to escape from local minima that are fallen into, and also because, even when an obstacle has been recognized to be present on the path of travel, the mobile robot does not change its path to avoid it until it has come close to the obstacle. The search method is further divided into two types. In the first, the mobile robot continues to move generally in the direction of the goal while changing its path whenever it is about to collide with an obstacle. In the second, the problem is replaced by one of finding the minimum network time and the optimum path is determined by investigating every possibility. Like the potential field method, the first method does not guarantee optimization. On the other hand, since the second method requires the direction of travel to be selected from among a large number of candidates every time a branch point is reached, it enlarges the space that has to be searched.

SUMMARY OF THE INVENTION

The object of the present invention is therefore to provide a system for obstacle avoidance path planning for a multiple-degree-of-freedom mechanism which greatly reduces the number of trial path searches and enables a smooth, economical path for the mechanism to be obtained quickly.

For realizing this object, the present invention provides a system for obstacle avoidance path planning for a multiple-degree-of-freedom mechanism moving from a predetermined point to a goal avoiding an obstacle, comprising, first means for virtually defining a viscous drag coefficient distribution at least on one of the obstacle and the mechanism, second means for determining a path on the basis of the variational principle as the extreme value for a functional of a factor relating to the viscous drag coefficient distribution, and third means for driving the mechanism along the determined path.

Two basic methods are available for obstacle avoidance. One is a correctional method in which unknown obstacles are avoided reactively and the other is a deterministic method in which the path is decided from start to end with respect to known obstacles. The method of this invention falls in the latter category. It should also be noted that the "obstacles" are not necessarily physical obstacles but can also be prohibited regions which the mobile robot is not allowed to traverse (or enter).

It should further be noted that, although, in the following a path along which the mobile robot travels is named in various expressions such as "trajectory", "locus" and "path", these terms are used on the assumption that there is no significant or substantial difference therebetween.

BRIEF DESCRIPTION OF THE DRAWINGS

The above and other objects and advantages of the invention will be more apparent from the following description and drawings, in which:

FIG. 9 is a table showing the locus characteristic expression of FIG. 7;

FIG. 10 is a table showing the locus characteristic expression of FIG. 8;

FIG. 11 is a table showing another locus characteristic expression applied to the locus of FIG. 7;

FIG. 12 is a table showing still another locus characteristic expression applied to the locus of FIG. 7;

FIG. 13 is a table, similar to FIG. 12, but a designated order of obstacle approach is made different from that of FIG. 12;

FIG. 16 is a table showing preferable characteristics of a trajectory defined in advance and used in the procedures of FIG. 14 flow chart;

FIG. 20 is a table showing an assumed result when the mobile robot traveled along the trajectory illustrated in FIG. 18;

DETAILED DESCRIPTION OF THE PREFERRED EMBODIMENTS

The invention will now be explained with reference to specific embodiments.

Figure 1:
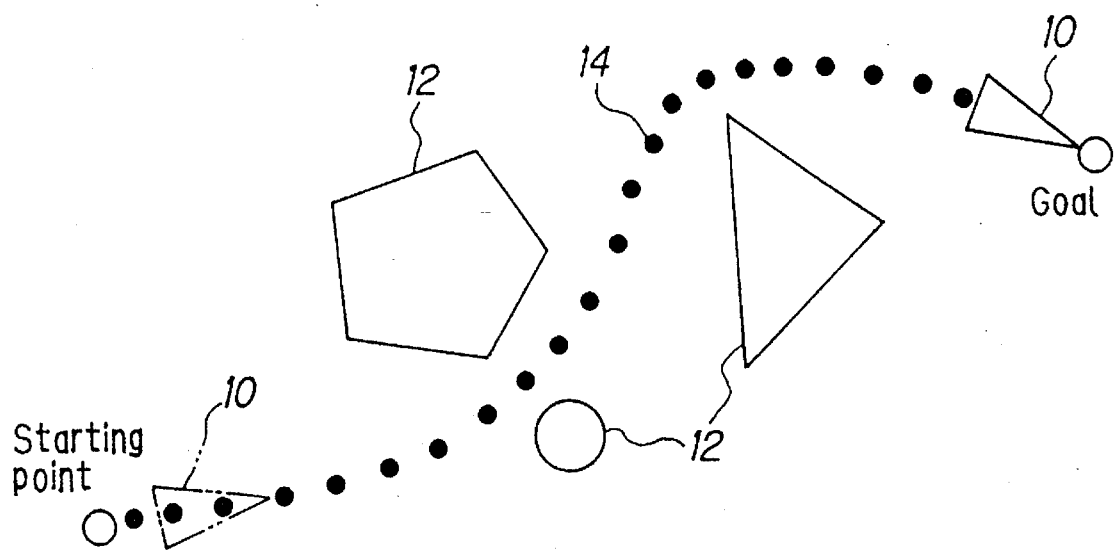
FIG. 1 is an explanatory view showing a system for obstacle avoidance path planning for a multiple-degree-of-freedom mechanism such as a mobile robot according to the invention and a path or trajectory found by the system avoiding obstacles, the presence of which is described in advance in an environment map stored in a control unit of the system.

FIG. 1 shows a multiple-degree-of-freedom mechanism 10 which is to navigate from a starting point to a goal while as explained in detail later determining a path or trajectory 14 enabling it to avoid obstacles 12. In this embodiment, the multiple-degree-of-freedom mechanism is assumed to be a legged, wheeled or crawler type autonomous mobile robot. The mobile robot 10 is equipped with appropriate drive means enabling it to navigate under its own propulsion. It is also equipped with a control unit, constituted as a microcomputer, for controlling the drive means. The obstacles, starting point and goal are all known in advance and an environment map including them is prepared in advance and stored in a memory of the microcomputer of the control unit of the mobile robot 10. The mobile robot is further equipped with internal sensors for measuring the amounts of its own movements and external sensors for measuring the distances between itself and the obstacles and goal.

Figure 2:
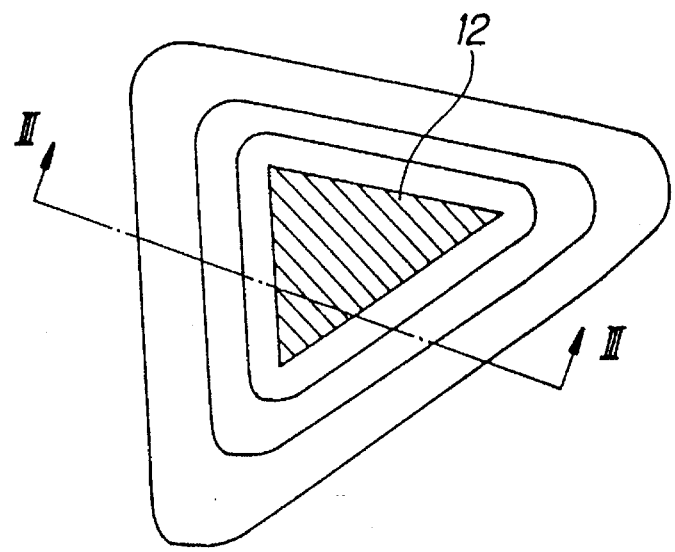
FIG. 2 is an explanatory view of each obstacle described in the environment map which is arranged to be surrounded by contours indicating the distribution of a virtual viscous drag coefficient.
Figure 3:
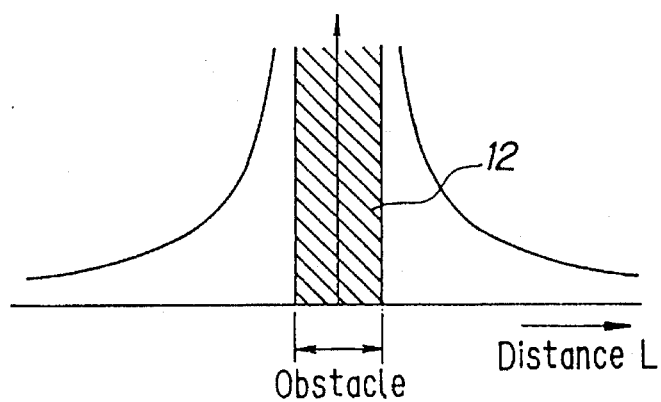
FIG. 3 is an explanatory cross sectional view taken along the line of III—III of FIG. 2.

One feature characterizing this invention is that, as shown in FIG. 2, each obstacle in the environment map is surrounded by contours indicating the distribution of a virtual viscous (frictional) drag coefficient. As shown in FIG. 3, the viscous drag coefficient is distributed so as to be very large, if not infinitely large, at the obstacle and to decrease exponentially with increasing distance from the obstacle. Although not shown in the drawings, the starting point and goal are also defined to have a similar viscous drag coefficient distribution so as to enable the mobile robot to stop at these points.

Another feature of the invention is that the variational principle (in which a basic physical law is represented in terms of an extreme value problem for a functional) is used to determine the path so as to attain the local minimum. A specific example of a simple functional is the time required for the mobile robot's movement.

One way of explaining the variational principle is by an analogy in which the mobile robot is considered to be a photon, the obstacles to be transparent light transmitting media of extremely high density (index of refraction), and each obstacle to be surrounded by a medium whose density decreases gradually with increasing distance from the obstacle. When light is emitted from the light source (corresponding to the starting point), each of the photons initially radiated in every direction advances in accordance with the density distribution of the surrounding space. Its velocity at any given point is inversely proportional to the density (index of refraction) at that point, and since the radius of curvature of its path is determined by the density distribution gradient, it can have only one trajectory determined by the conditions. Insofar as there are no discontinuities in the density distribution, the properties of light ensure that a part of the photons radiated in every direction from the light source will reach the goal.

Moreover, the trajectory of a photon that arrives at the goal will always follow the local minimum time path or a close value thereto avoiding the obstacles or one close thereto. (If the goal is a point, it will follow the local minimum time path.) This is true because a photon passing through two points always follows the local minimum time path between the two points. In addition, if the density of the obstacles and the medium in the vicinity thereof is defined to be very large or infinite, the paths passing through the obstacles will be paths requiring an extremely long time to traverse and, as such, will not be minimum time paths. Therefore, if for enabling utilization of the variational principle the drag coefficient is given a distribution such that it is very large at the obstacles and has a gradient which decreases with increasing distance from the obstacles (approaches zero or some fixed value), the path will not go through the obstacles and the velocity will be lower at points where the radius of curvature of the trajectory is larger. It will thus be possible to obtain a smooth mobile robot's path and to reduce greatly the amount of search work required to find the optimum path.

Whatever method is used, however, it is important to be able to ascertain with high efficiency the initial state (e.g. the initial direction) enabling arrival at the goal, i.e. to be able to find the initial state enabling arrival at the goal with the minimum possible number of search operations. While it is possible to ascertain the initial state through a random search, it is more efficient to make use of whatever search history information is available for searching out each subsequent candidate. For this it is necessary to establish a method for qualitatively or quantitatively expressing the characteristics of the individual loci. In this invention, the obstacle approach information referred to below is used the basic information for this purpose.

How close the mobile robot passes on which side of an obstacle or the goal can be defined in various ways, among which the following are the most typical:

(1) Viewed locally, on which side of the obstacle (left or right relative to the direction of travel) the point on the path closest to the obstacle concerned lies (the goal also being considered an obstacle for the purpose of this and the following items).

(2) Viewed locally, on which side of the obstacle and how far therefrom the point on the path where the effect of the viscous drag coefficient is strongest lies.

(3) When the mobile robot moving from the starting point to the goal (to an intermediate point if it does not reach the goal) is viewed from a fixed point in the obstacle concerned and a check is made as to whether the mobile robot is seen to pass to the left or right, it is deemed that the mobile robot passed on the left side (right side) of the obstacle concerned as viewed from the mobile robot if it passed counterclockwise (clockwise).

Figure 4:
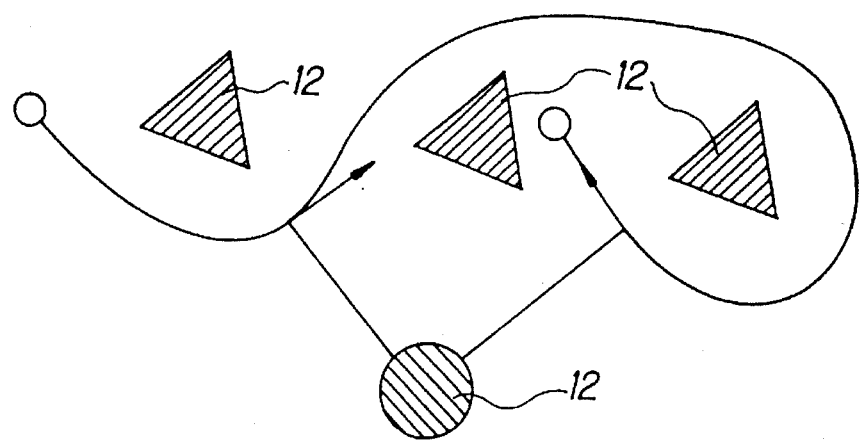
FIG. 4 is an explanatory view of environment in which the number of obstacles is large.

Since it is difficult to express proximity accurately by (3) above, (1) and (2) are more appropriate for expressing proximity in quantitative terms. If (1) or (2) is used, however, it must be remembered that when the number of obstacles is large and the loci become complex, cases may arise in which the same obstacle is locally approached two or more times, as illustrated in FIG. 4. In the following description, the point of local maximum approach to an obstacle is referred to as the "local perigee" and is defined in terms of (1) or (2).

Figure 5:
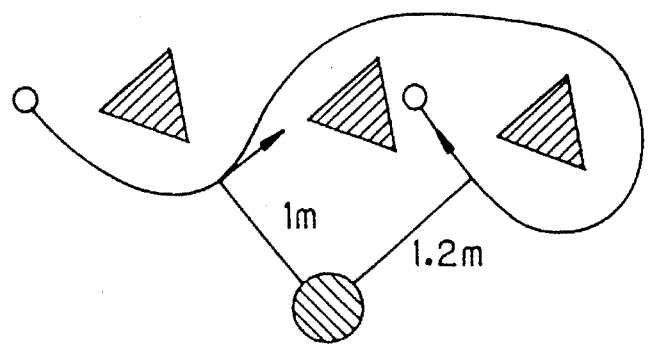
FIG. 5 is an explanatory view showing a locus or path for explaining locus characteristic expression.
Figure 6:
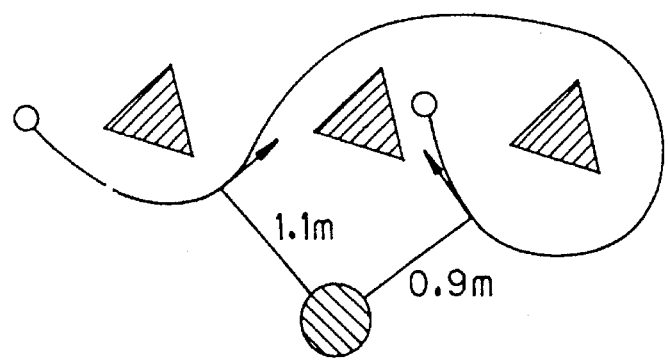
FIG. 6 is an explanatory view showing another locus passing through almost the same locations as that of FIG. 5 for explaining the locus characteristic expression.

Another important aspect in expressing the characteristics of loci is how well the similarity of two compared locus pairs is expressed. Consider, for example, the case where the characteristics of loci are expressed in terms of information regarding the distance to and direction of each obstacle at the time of closest approach thereto. When this method of expression is applied to FIG. 5, the expression becomes that the round obstacle is approached to 1 m on the right, but when it is applied to FIG. 6, it becomes that the round obstacle is approached to 0.9 m on the left. In other words, the characteristics of the two loci are expressed as if they are opposite in nature, notwithstanding that they pass through almost the same locations. As a method for overcoming this problem and expressing degree of similarity in a simple manner, the invention uses a method, such as one of those described below, which takes the approach order into consideration.

Figure 7:
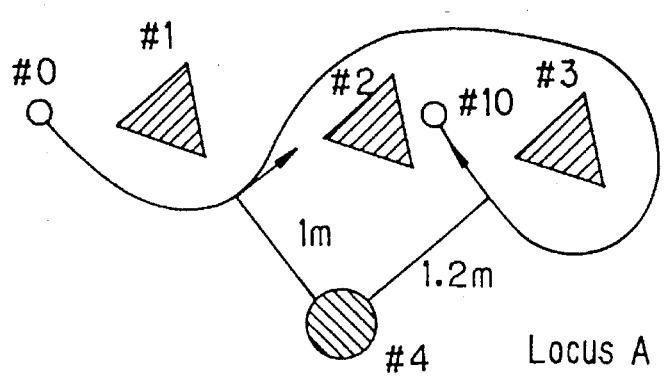
FIG. 7 is an explanatory view showing an example of locus characteristic expression applied to the locus of FIG. 5.
Figure 8:
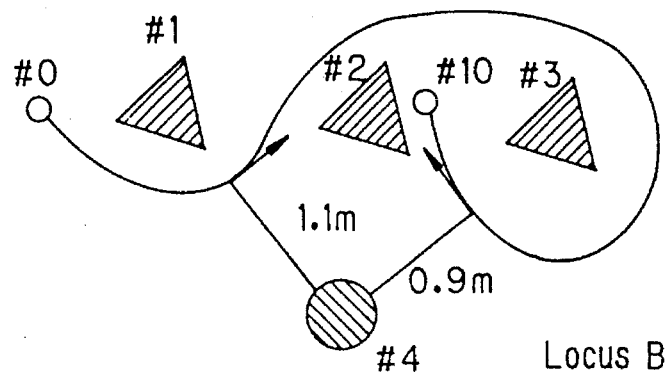
FIG. 8 is an explanatory view showing another example of the same locus characteristic expression applied to the path of FIG. 6.

In one method, the locus is followed from the starting point and as each local perigee appears the name of the obstacle, the direction in which the obstacle is seen and the distance thereto are recorded. (Since the starting point and goal are conceptually identical with the obstacles, they are treated in the same way as the obstacles.) By way of example, the loci of FIGS. 7 and 8 will be expressed in accordance with this method. For enabling the proximity and direction of an obstacle, starting point or goal to be expressed in combination, the proximity is expressed as a positive distance when the obstacle etc. is seen to the left relative to the direction of movement and as a negative distance when it is seen to the right. In terms of their characteristic expressions, the loci A and B differ only slightly in perigee and are otherwise very similar. The characteristics of the loci are expressed as shown in tables illustrated in FIGS. 9 and 10. An expression of this type is referred to as a "composite expression 1".

According to another method, the locus is followed from the starting point and as the first local perigee appears for each obstacle the name of the obstacle, the direction in which the obstacle is seen and the distance thereto are recorded in the order of the obstacles. No such information is recorded for second and later local perigees for one and the same obstacle. In this case, locus A referred to above (FIG. 7) is expressed as shown in a table illustrated in FIG. 11. An expression of this type is referred to as a "composite expression 2."

According to still another method, the order in which the obstacles are approached is designated in advance. More specifically, the locus is followed from the starting point and when the first designated obstacle is locally approached to the perigee, the name of the obstacle, the direction in which the obstacle is seen and the distance thereto are recorded. Thereafter, at the time of local maximum approach to the second designated obstacle, the name of the obstacle, the direction in which the obstacle is seen and the distance thereto are similarly recorded. The third and later designated obstacles are handled in the same way. In this case, locus A referred to above (FIG. 7) is expressed as shown in tables illustrated in FIGS. 12 and 13. An expression of this type is referred to as a "composite expression 3 (order designated type)".

A look will now be taken at the method used for using the aforesaid path characteristic expressions for evaluating the similarity of two loci. When two arbitrary initial states are similar, the trajectories obtained therefrom will also be evaluated as similar. When the two initial states are gradually shifted away from each other, the first effect is that one or more perigees in one of the aforesaid locus characteristic expressions changes. Then, as the magnitude of the shift increases, differences begin occurring in the obstacles, ordinarily starting from the last obstacle in the order of approach. In view of this, the following methods are considered to be appropriate for evaluating similarity:

(1) Comparing the obstacle names from earlier to later in the order approached, ascertaining up to what number obstacle they correspond, and rating the degree of similarity to be higher for a larger number of matches (2) For more precise rating of similarity after the names of the obstacles have been found to match up to the nth number, comparing the approach directions from earlier to later up to the nth number, ascertaining up to what number the approach directions match, and rating the degree of similarity to be higher for a larger number of matches.

(3) For more precise rating of similarity after the approach directions have been found to match up to the mth number (m≦n), comparing the perigees at the mth number, and rating the degree of similarity to be higher for smaller difference between the distances.

(4) For more precise rating of similarity after the approach distances have been found to match at the mth number (m<n), comparing the perigees at the (m+1)th number, and rating the degree of similarity to be higher for smaller difference between the distances.

While the similarity evaluation can be conducted by the same procedure irrespective of which of these characteristic expressions is adopted, care must be exercised in the case of characteristic expressions (2) and (3). This is because they omit a part of characteristic expression (1) and, therefore, the fact that they give a high similarity rating does not necessarily guarantee close initial states.

There are generally two or more local minimum time trajectories that reach the goal. Where this is the case and it is necessary to select a single obstacle avoiding trajectory from among them, the following are considered to be typical methods usable for this purpose.

(a) Compute all local minimum time trajectory and select the optimum one.

(b) Use the first local minimum time trajectory found.

(c) Designate preferable characteristics of the local minimum time trajectory (locus) in advance (i.e. designate how it is to pass) and find the local minimum time trajectory that has the required characteristic from among the computed local minimum time trajectories.

Method (a) is apt to require too much time for the search operation. Where strict optimization is not required, therefore, it is advisable to adopt method (b) or (c) in the interest of speed. Of these, method (c) has the advantage of enabling similarity information to be used to conduct the search by a relatively simple procedure. Therefore, trajectory determination using method (c) will be explained in the following. (Composite expression 3 will be used for locus characteristic expression.)

Figure 14:
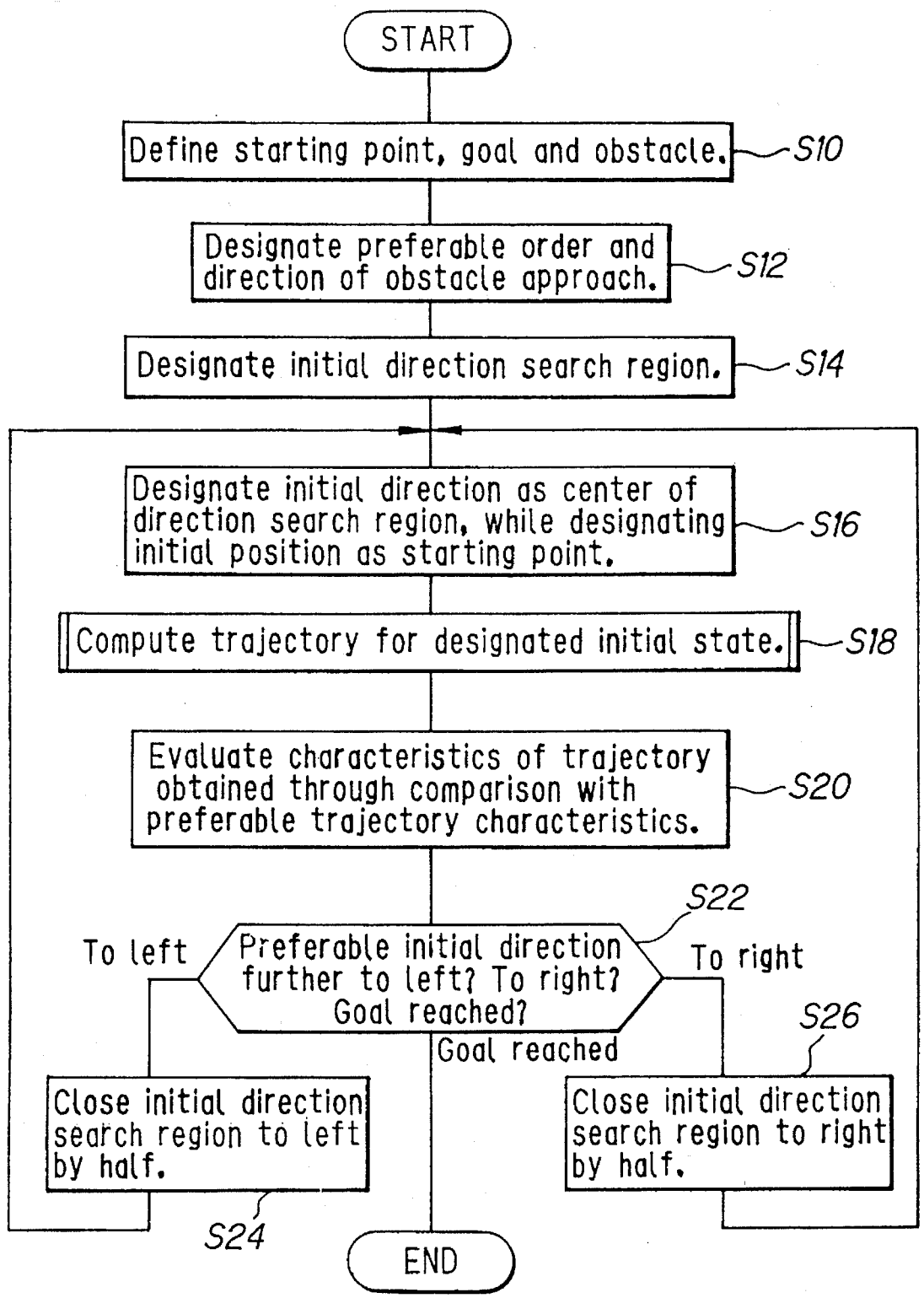
FIG. 14 is a flow chart showing the operation of the system for trajectory determination (path planning) using a method in which the characteristic required of the local minimum time trajectory is designated in advance.
Figure 15:
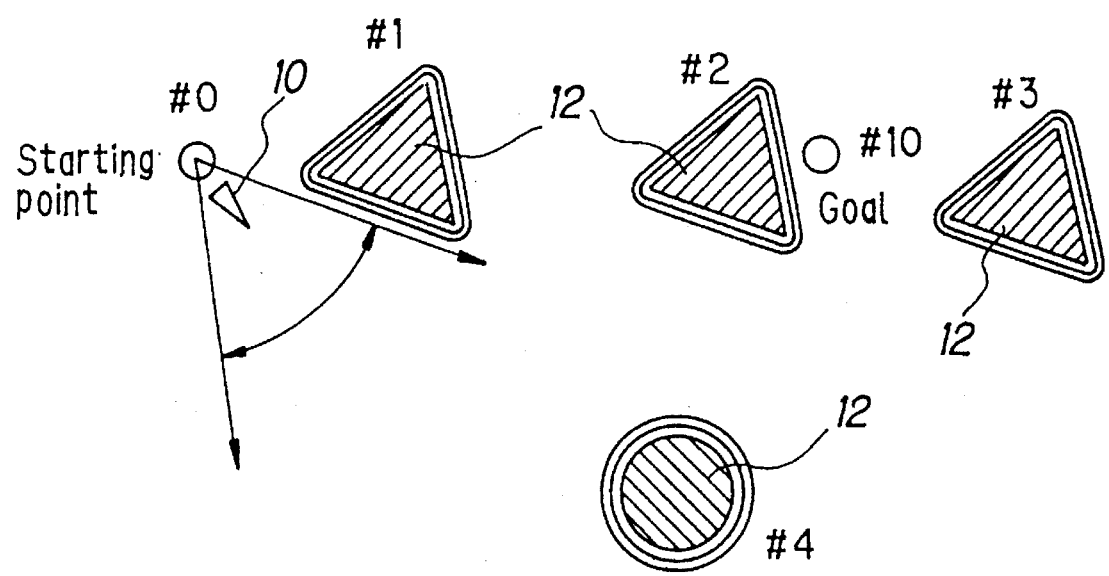
FIG. 15 is an explanatory view showing the environment defined in the procedures of FIG. 14 flow chart.

A flow chart of the method is shown in FIG. 14. The starting point, goal and obstacles are defined in step S10. The viscous drag coefficient distribution for these is also defined as shown in FIG. 15.

Control then passes to step S12 in which the aforesaid preferable trajectory (locus) characteristics, i.e., the order and direction of obstacle approach are designated. Thus, in the method under discussion, the mobile robot is assigned the instruction onto "how to travel" in advance, more specifically, to avoid the obstacles in the left or in the right etc. are defined in advance and based on the conditions, a trajectory (path) is actually determined.

Therefore, if the initial preferable conditions for obstacle avoidance (trajectory characteristics) is erroneously defined, it may happen that the actual trajectory determined to follow the conditions does not arrive at the goal. While this makes it necessary to change the conditions for obstacle avoidance, the efficiency of the method is nevertheless high since, as was pointed out earlier, it enables the number of searches to be reduced relative to one in which a random search is conducted. The designated order of obstacle approach is #0, #2, #3, #4, #10. In addition, the obstacle approach directions are designated, as right (negative) and left (positive), and the preferable trajectory (locus) characteristics are promised as shown in a table of FIG. 16.

Control then passes to step S14 in which the initial direction search region is designated. Specifically, as shown in FIG. 15, an appropriate angular range is set as the initial direction search region. Then, in step S16, the initial direction is designated to be the center of the search region, the starting point is made the initial position, and movement is begun. However, if the viscous drag coefficient of the starting point is infinitely large, movement becomes impossible when the initial position is set at the starting point. In such case, therefore, the initial position is set to be slightly apart from the starting point. Control then passes to step S18 in which the trajectory for the designated initial state is computed.

Figure 17:
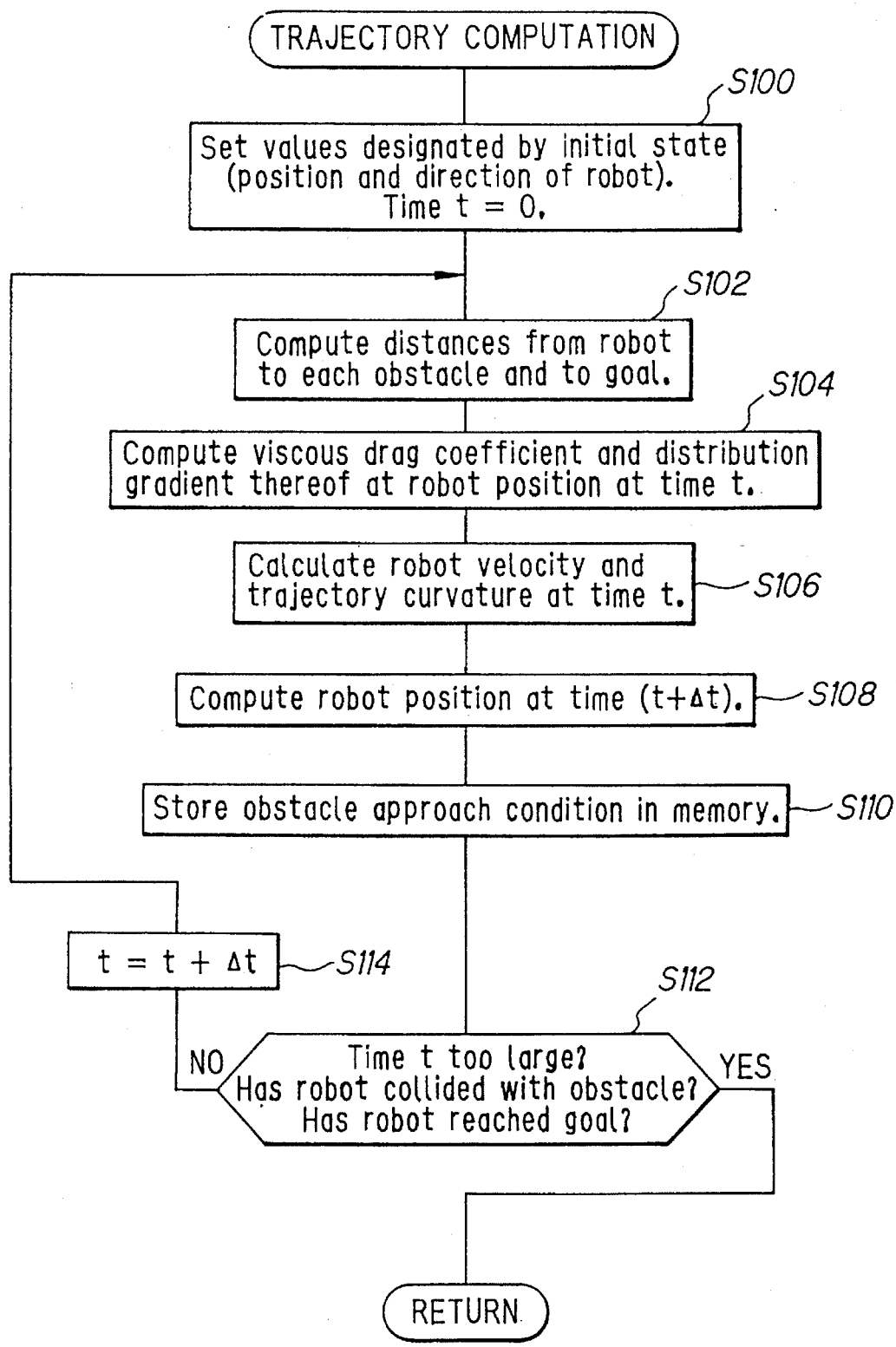
FIG. 17 is a subroutine flow chart of FIG. 14 flow chart for trajectory computation.

The flow chart of a subroutine for this computation is shown in FIG. 17. In step S100 of this subroutine, the parameters are set in the microcomputer of the control unit of the mobile robot 10 to the values indicated by the aforesaid initial state and a timer of the microcomputer is set to time t=0.

Figure 18:
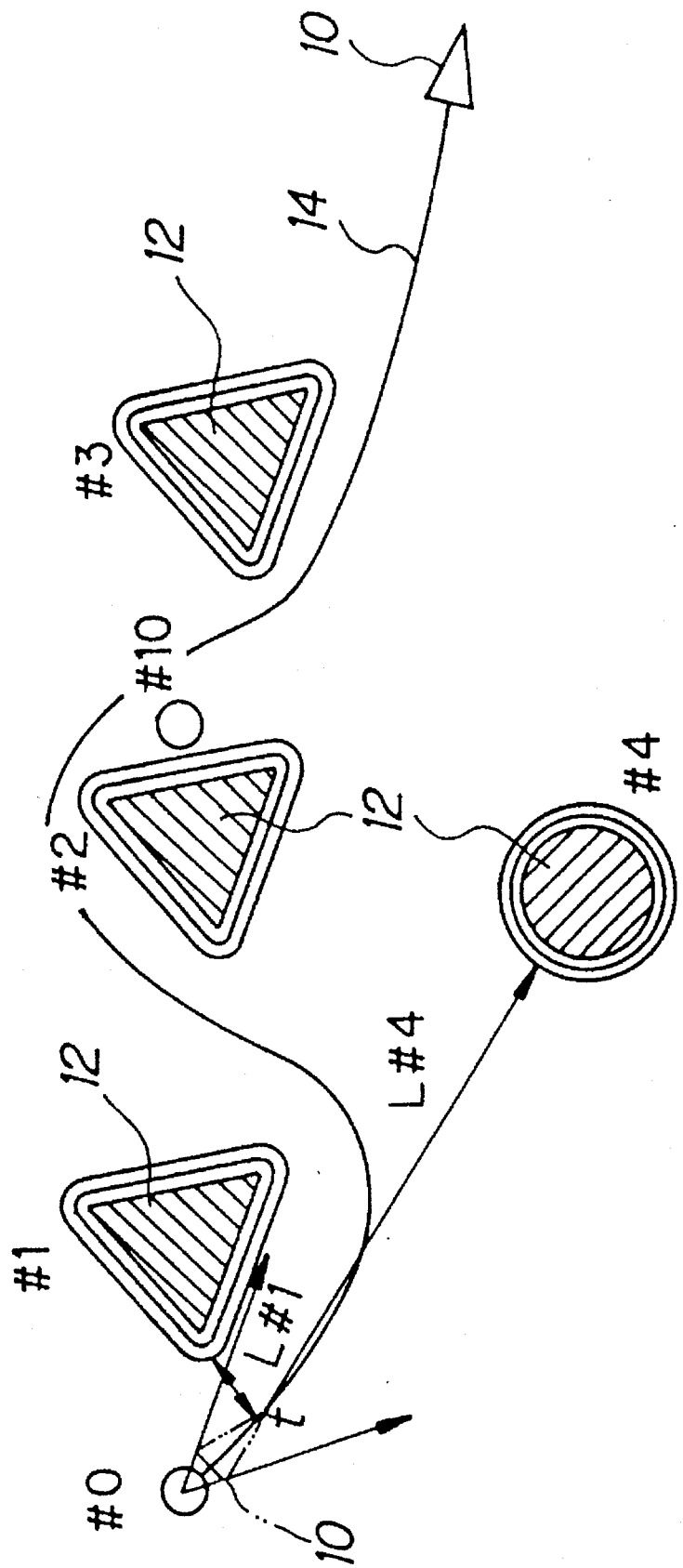
FIG. 18 is an explanatory view for explaining distance computation referred in the procedures of FIG. 17 flow chart.

Control then passes to step S102 in which the control unit of the mobile robot 10 uses information obtained through appropriate sensors for computing the distances between the mobile robot 10 and the respective obstacles and between the same and the goal, as shown in FIG. 18 (which shows only the distances L#1 and L#4 to obstacles #1 and #4.). Control then passes to step S104 in which the viscous drag coefficient rho ($\vec{r}$) and the distribution gradient thereof grad rho ($\vec{r}$) at the vehicle position $\vec{r}$ are calculated according to Equations (1). The values are calculated as functions of the distances just obtained. In Equation (1), C is a constant.

Viscous drag coefficient $\rho = f(L\#1) + f(L\#2) + f(L\#3) + \ldots + C$ (1)

Distribution gradient grad $\rho(r) = \text{grad } f(L\#1) + \text{grad } f(L\#2) +$ grad $f(L\#3) + \ldots$ Next, in step S106, the movement velocity and trajectory curvature p at time t are calculated. When the mobile robot advances under propulsion through the space imparted with the viscous (frictional) drag coefficient, its velocity is determined by the equilibrium between the propulsion and the viscous drag coefficient as: Velocity =Propulsion/Viscous drag coefficient. In general, moreover, where the curve y=f(x) is a path passing through two points A and B, the time T required to pass from point A to point B along the path of curve y=f(x) is as expressed by Equation (2). If the path connecting the points A and B is the minimum time path, it satisfies Euler's equation, and, therefore, in the minimum time trajectory based on the variational principle the relationship between the trajectory curvature p and the drag coefficient rho ($\vec{r}$) is as expressed by Equation (3). (In Equation (3), $\vec{e}$ is the movement direction vector at point $\vec{r}$ on the locus, and the movement velocity vector $\vec{v}$ at the same point is defined by Equation (4).)

Time $T = \int (\rho(x,y)/F_0) ds$ \hfill Eq (2)

where:

s: movement path $F_0$: propulsion $\rho(x, y)$: viscous drag coefficient at coordinates (x, y)

$$\text{Curvature } p = \frac{\text{grad } \rho(r)}{\rho} * \vec{e} \quad (3)$$

$$\text{Movement direction vector } \vec{e} \equiv \frac{\vec{v}}{|\vec{v}|} \quad (4)$$

Figure 19:
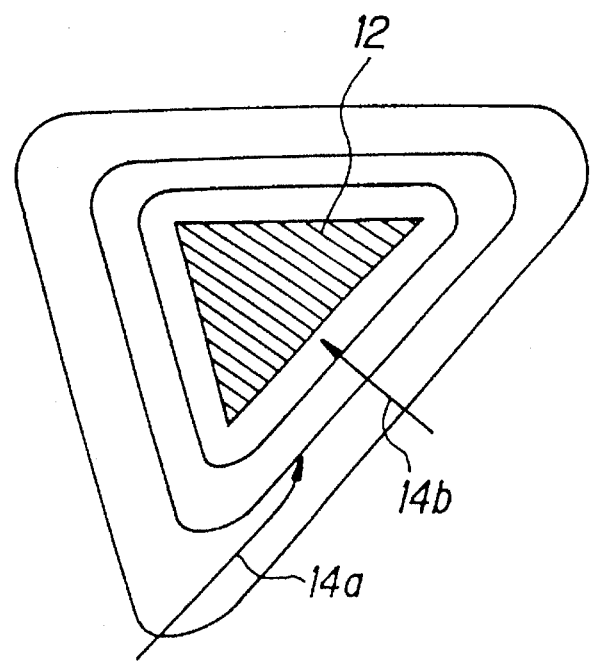
FIG. 19 is an explanatory view showing the trajectory computed in the procedures of FIG. 17 flow chart on the basis of the variational principle.

Control then passes to step S108 in which the position and direction of the mobile robot at time delta t after the current time t are computed. More specifically, combining and expressing Equations (1), (3) and (4) in discrete terms gives Equations (5), which are used to compute the position to which the mobile robot is expected to move delta t later. The computed value is written to the coordinate memory of the microcomputer in the mobile robot 10 and the distance to the goal is computed (assuming a constant propulsion F0). As shown in FIG. 19 (and as is well known), the trajectory computed on the basis of the variational principle curves in the direction of larger drag coefficient when moving along the surface of an obstacle (as indicated by 14a) and moves straight ahead when advancing perpendicular to the obstacle surface (as indicated by 14b). Thus, if the drag coefficient of the obstacle 12 is defined to be infinite, the mobile robot stops thereat. The trajectory is therefore determined so as to avoid the obstacles 12 on the way to the goal but to collide with the goal.

$$\text{Velocity } v_{t=t} = \frac{F_0}{\rho(r_{t=t})}$$

where $F_0$: propulsion $$\text{Curvature } p_{t=t} = \frac{\text{grad } \rho(r_{t=t})}{\rho(r_{t=t})} * \vec{e}_{t=t} \quad (5)$$

$$\angle \vec{e}_{t=t+\Delta t} = \angle \vec{e}_{t=t} + \Delta t \cdot v_{t=t} \cdot p_{t=t}$$

-continued $$\vec{r}_{t=t+\Delta t} = \vec{r}_{t=t} + \Delta t \cdot v_{t=t} \cdot \vec{e}_{t=t}$$

$$\left( \begin{array}{c} \text{Or} \\ \vec{r}_{t=t+\Delta t} = \vec{r}_{t=t} + \Delta t \cdot v_{t=t} \cdot \dfrac{\vec{e}_{t=t} + \vec{e}_{t=t+\Delta t}}{2} \end{array} \right)$$

Control then passes to step S110 in which the obstacle approach condition is stored in memory, through step S112 to step S114 in which time t is incremented by delta t, and then back to step S102 for repeating the same operations. In step S112, if it is found that time t is larger than a prescribed limit value (i.e. if the mobile robot has gone by the goal) or if the robot has collided with an obstacle or reached the goal, the subroutine is terminated. The mobile robot is judged to have reached the goal when it has come within a prescribed distance of the goal.

Control then passes to step S20 of the flow chart of FIG. 14, where the characteristics of the trajectory obtained are evaluated through comparison with the preferable trajectory characteristics. More specifically, the trajectory obtained is compared with the preferable trajectory (characteristics) and starting from the earliest member in the obstacle approach order it is checked if the approach directions agree. If at the place where the first discrepancy arises the direction of trajectory obtained is to the left whereas the preferable trajectory is to the right, assume that the initial direction of the preferable trajectory is further to the right. In the opposite situation, it is assumed that it is further to the left.

As a specific example, suppose that the characteristics of a table shown in FIG. 20 were obtained by the movement shown in FIG. 18.

The degree of similarity between the trajectory (locus) 14 shown in FIG. 18 and the preferable trajectory characteristics is checked. Regarding obstacle name, trajectory 14 agrees with the preferable characteristics up to #4 in the approach order. Further, regarding perigee, the trajectory 14 satisfies the conditions of the preferable trajectory up to #2 in the approach order but at #3 approaches up to +0.3 m from the opposite direction to that of the computed trajectory. After completing this analysis, if at the place where the first discrepancy arises the direction of the trajectory obtained is to the left whereas that of the preferable trajectory characteristics is to the right, it can be concluded that the initial direction of the preferable trajectory characteristics is further to the right, while in the opposite situation it can be concluded to be further to the left. Control then passes to step S22 in which, based on the evaluation, either step S24 or step S26 is selected for closing the initial direction search region by half either to the left or right, and then back to step S16 for repeating the same operations, the loop being repeated until step S22 finds that the goal has been reached.

Since the vicinity of an obstacle is defined to be a virtual space having a continuous viscous drag coefficient that increases exponentially with increasing proximity to the obstacle, it becomes possible to determine the trajectory on the basis of the variational principle relating to the extreme value problem for a functional such as the time, energy or the like required for the movement. Since the drag is greatest at the obstacle, the determined trajectory does not go through the obstacle. Thus the obstacle can be avoided without fail. Moreover, the fact that the trajectory is determined based on the variational principle means that if, as in the embodiment, the time required for the movement is adopted as the functional, the determined trajectory will locally be that of minimum time. Since it also means that the velocity can be reduced in the vicinity of the obstacle and that the change in velocity can be made gradually, the trajectory is smooth and optimum for the mobile robot.

Moreover, since the trajectory is determined on the basis of the variational principle, the velocity decreases with increasing proximity to an obstacle and the rate of decrease can determined to change gradually. As a result, the optimum trajectory for the mobile robot can be achieved. In addition, since not only the space around the obstacles but also that around the starting point and the goal is defined to have the virtual viscous drag coefficient distribution, the obstacles, starting point and goal can all be treated in the same manner. It therefore becomes very easy to write the required program in the case of adopting a software method.

Figure 21:
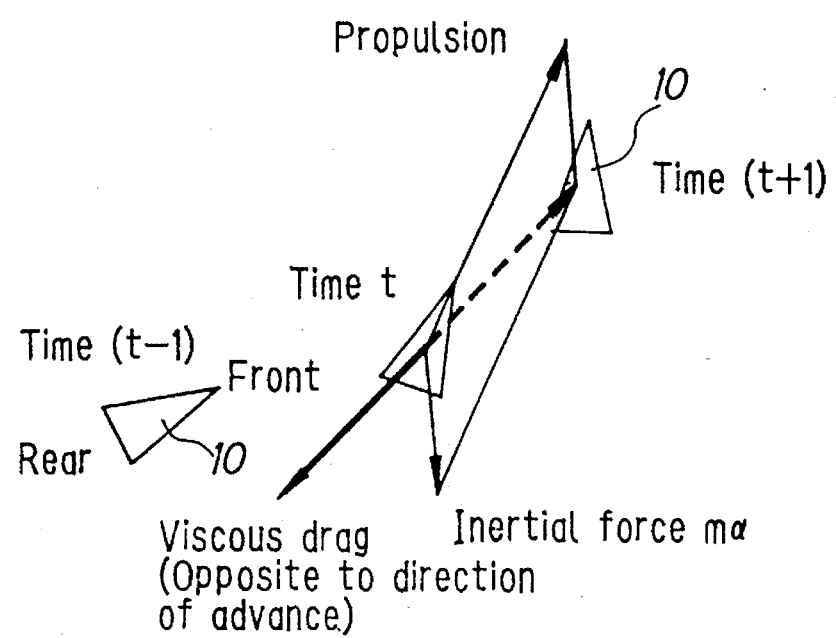
FIG. 21 is an explanatory view showing a second embodiment of the invention in which a virtual inertial force is additionally provided.

FIG. 21 is a diagram for explaining a second embodiment of the invention. This embodiment is additionally provided with a virtual inertial force and, as shown in FIG. 21, the trajectory of the mobile robot 10 is determined such that it advances in the direction wherein an equilibrium is obtained among the viscous drag coefficient, the propulsion and the virtual inertial force. More specifically, the mobile robot 10 is defined to behave in the manner of a coasting automobile. Compared with the first embodiment, this embodiment provides a smoother trajectory and, as such, prevents quick turns at high speed.

Figure 22:
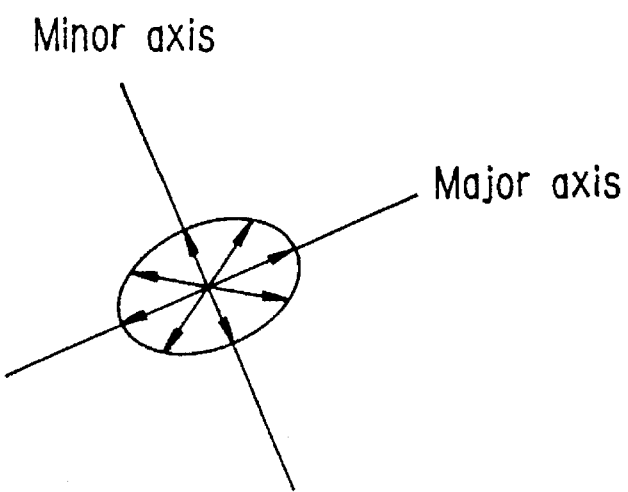
FIG. 22 is an explanatory view showing a third embodiment of the invention in which the viscous drag coefficient distribution is imparted with anisotropy.
Figure 23:
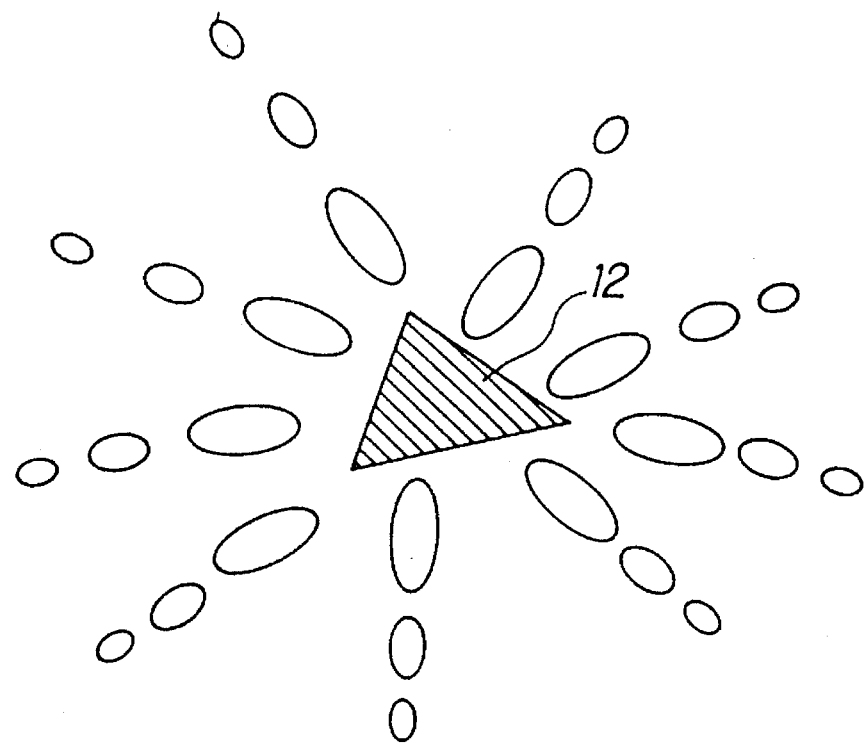
FIG. 23 is an explanatory view showing the viscous drag coefficient distribution in the third embodiment.

FIG. 22 is a diagram for explaining a third embodiment of the invention in which the viscous drag coefficient is imparted with anisotropy. While the speed when moving perpendicular to the surface of an obstacle has to be limited, higher speeds are permissible when moving along its surface. At every point the viscous drag coefficient is therefore imparted with anisotropy so as to be weaker in the direction in which higher speed is permissible. Specifically, as shown in FIG. 22, the anisotropic viscous drag coefficient can be represented as an ellipse in which vectors connecting the center of the ellipse with its circumference are defined as representing the coefficient in the direction concerned. As a result, the drag in the direction of the major axis of the ellipse is large and that in the direction of the minor axis is low. FIG. 23 shows the viscous drag coefficient distribution relative to an obstacle. (In FIG. 22, if no anisotropy is imparted to the drag coefficient, the ellipse becomes a true circle.)

Figure 24:
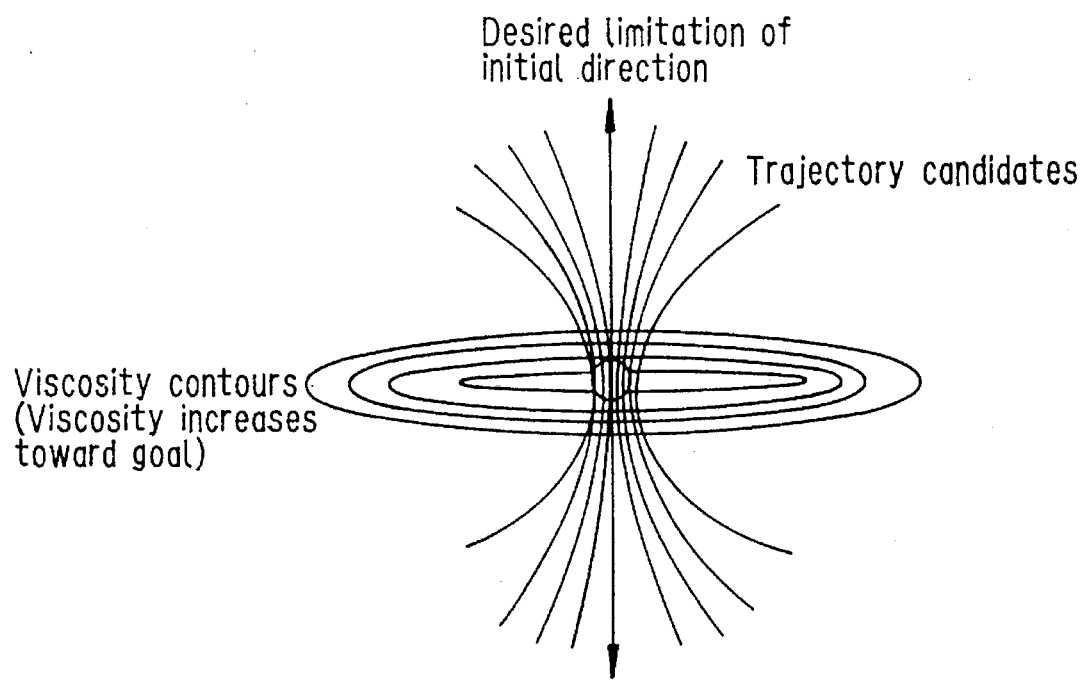
FIG. 24 is an explanatory view showing a fourth embodiment of the invention.

FIG. 24 is a diagram for explaining a fourth embodiment of the invention in which the space around the starting point is imparted with an elliptical viscous drag coefficient distribution for limiting the initial direction of the mobile robot. When the initial direction is fixed in the sense that it is for an automobile, imparting an elliptical viscous drag coefficient distribution around the starting point in the illustrated manner has the effect of limiting the initial directions in which the goal can be reached. This is because if the initial direction is shifted even slightly from that in which it is to be limited (or if the initial position is shifted even slightly), the mobile robot will have its direction of advance turned very greatly by the elliptical drag coefficient distribution. As a result, advance in any direction can be achieved by varying the initial direction (or initial position) over a very small range. Imparting a similar elliptical viscous drag coefficient distribution around the goal limits the directions from which the goal can be approached.

Figure 25:
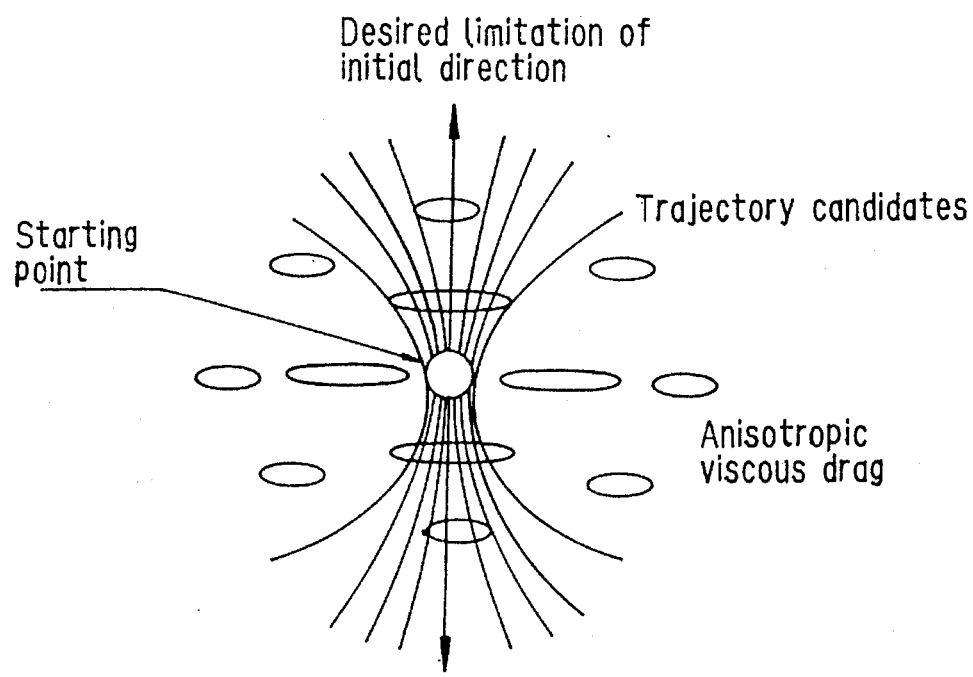
FIG. 25 is an explanatory view showing a fifth embodiment of the invention.

FIG. 25 is a diagram for explaining a fifth embodiment of the invention in which the space around the starting point is imparted with an anisotropic viscous drag coefficient distribution for limiting the initial direction of the mobile robot. Imparting the space around the goal with similar characteristics makes it possible to limit the directions from which the goal can be approached.

Figure 26:
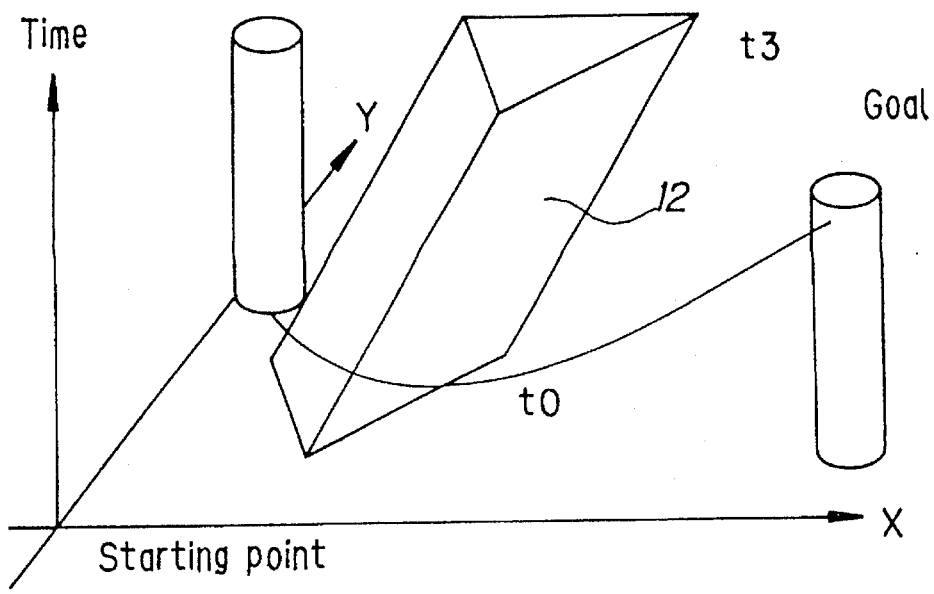
FIG. 26 is an explanatory view showing a sixth embodiment of the invention.
Figure 27:
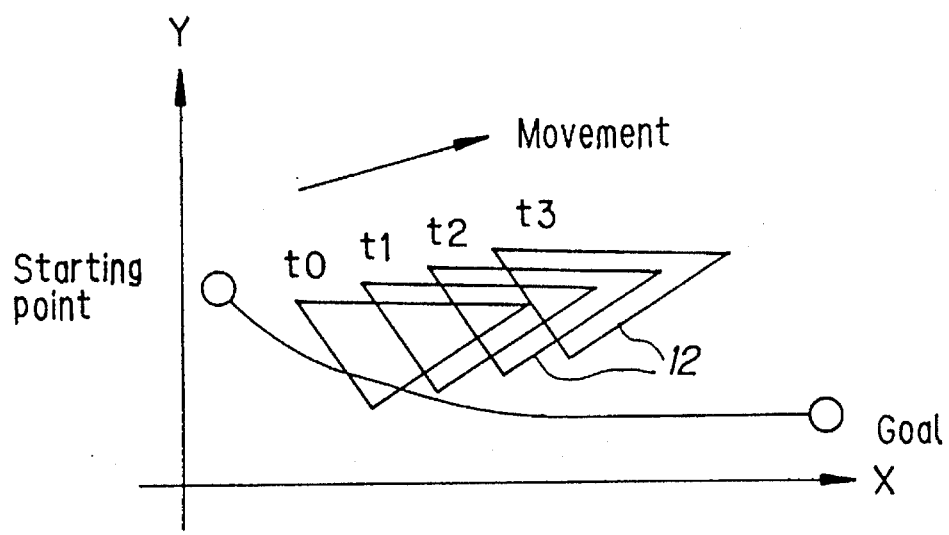
FIG. 27 is an explanatory view showing the first embodiment in contrast to the sixth embodiment.

FIG. 26 is a diagram for explaining a sixth embodiment of the invention. In contrast to the first embodiment which uses a two-dimensional x-y coordinate system as shown in FIG. 27, this embodiment adds a time axis for enabling moving obstacles to be expressed in three-dimensional space. Although the sixth embodiment adds a time axis, it is alternatively possible to define a three-dimensional space by adding a z (vertical) axis or to define fourth and higher dimension spaces.

Figure 28:
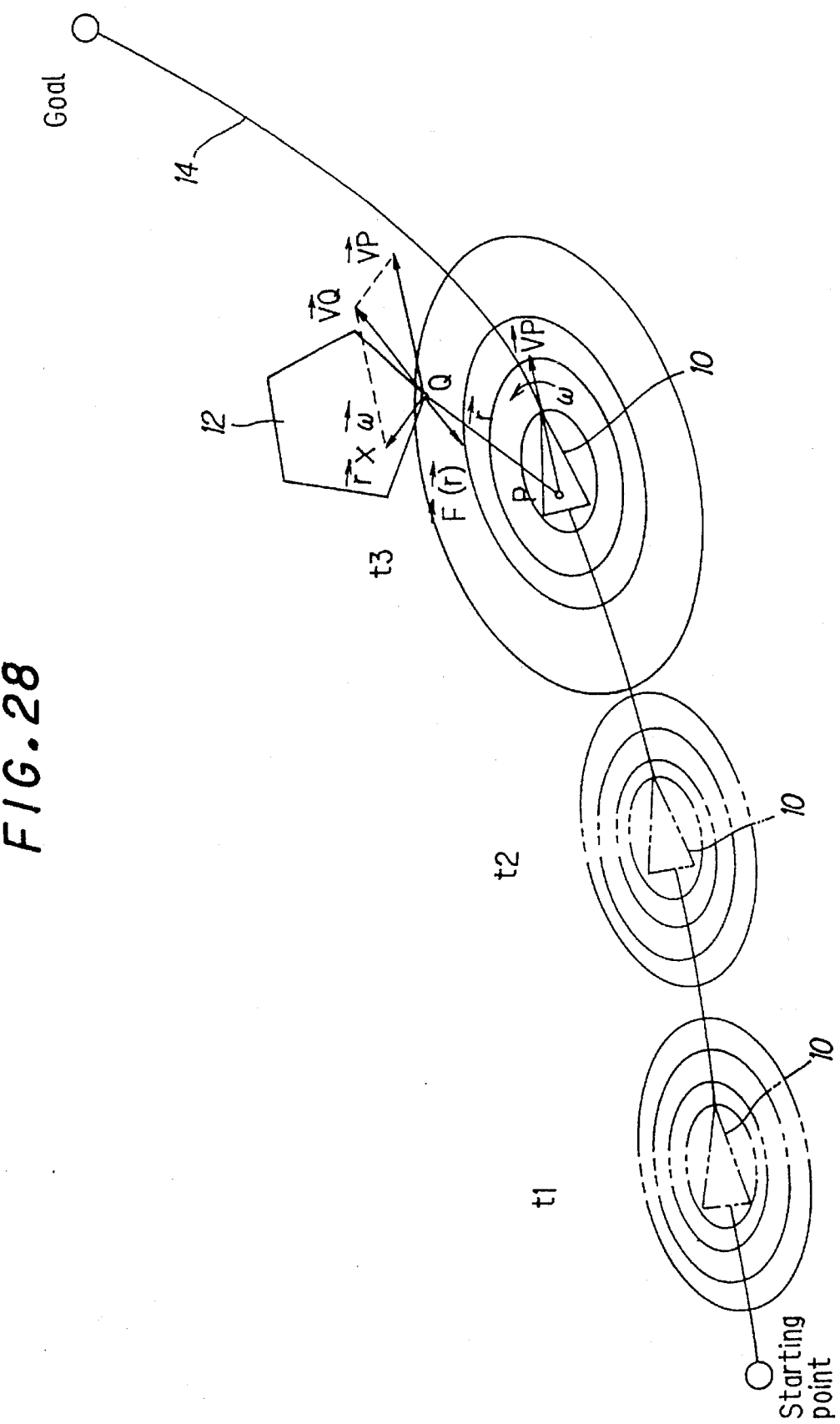
FIG. 28 is an explanatory view showing the seventh embodiment of the invention.

FIG. 28 is a diagram for explaining a seventh embodiment of the invention. In this embodiment, the mobile robot itself is defined to be a virtual space, which shifts as the mobile robot 10 moves, having a continuous viscous drag coefficient that increases monotonously with increasing proximity to the mobile robot. In other words, no viscous drag coefficient distribution is imparted at the obstacle 12, the starting point and the goal. In this embodiment, imagine the mobile robot 10 is a brimmed member which moves on a smooth surface such as a transparent glass and the obstacle 12 is an existence that has a coarse surface like a ground glass.

In the figure, assume that the mobile robot 10 traveled passing positions at times t1, t2 and at time t3, it came close to the obstacle 12. The terms $\vec{v}P$ and $\vec{\omega}$ are velocity and angular velocity of the mobile robot 10. Here, let us observe how force acts at a point. It should be noted that for ease of illustration, the viscous drag coefficient distribution is enlarged at the position at time t3 than those at times t1 and t2.

In the figure, the point in the viscous drag coefficient distribution, immediately underneath of which the obstacle's end exists, is designated as "Q". And "$\vec{r}$" is relative coordinates when viewed the point Q from a point P at the mobile robot 10 (the point P may be the robot's origin, for example).

When the force acting on the mobile robot from the obstacle 12 is designated as $\vec{F}(\vec{r})$, it will be produced in proportion to the relative velocity between the obstacle 12 and the point Q. The velocity $\vec{v}Q$ at the point Q, which moves as the robot moves, in the absolute space will be expressed as Equation (6).

$$\vec{v}Q = \vec{v}P + \vec{r} \times \vec{\omega} \qquad (6)$$

Here, when the coarseness of the surface, with which the point Q is in contact, is zeta, and the viscous drag coefficient at the point Q is rho, the force $\vec{F}(\vec{r})$ will be expressed as Equation (7).

$$\vec{F}(\vec{r}) = -\zeta \rho \vec{v}Q \qquad (7)$$

And, when force that acts from the surface to the mobile robot 10 is designated as Ftotal, it will be expressed as Equation (8). In addition, when moment around the point P that acts from the surface to the mobile robot 10 is designated as Mtotal, it will be expressed as Equation (9). In the Equations, the term "S" means the area through which the viscous drag coefficient is distributed.

$$\text{Ftotal} = \int_S F(r)\,ds \qquad (8)$$

$$\text{Mtotal} = \int_S r \times F(r)\,ds \qquad (9)$$

Now, propulsion of the mobile robot 10 is designated as Fp and assuming that the mobile robot 10 does not produce the moment, formulas of equilibrium such as Equation (10) will be obtained, if the robot's inertial force is ignored. (At this instance, the equilibrium may be formulated taking into consideration the virtual inertial force referred to in the second embodiment.)

$$\begin{cases} \text{Ftotal} = -Fp \\ \text{Mtotal} = 0 \end{cases} \qquad (10)$$

From the foregoing, formulas of equilibrium onto the force and moment will be stated as Equation (11).

$$\begin{cases} \int_S \zeta\rho(\vec{v}P + \vec{r} \times \vec{\omega})\,ds = Fp \\ \int_S \vec{r} \times \zeta\rho(\vec{v}P + \vec{r} \times \vec{\omega})\,ds = 0 \end{cases} \qquad (11)$$

Therefore, by calculating the robot's velocity $\vec{v}P$ and its angular velocity $\vec{\omega}$, the robot's next position at next time will be computed from the current position. Thus, the seventh embodiment can have the same effect as the aforesaid embodiments, since the robot's motion is a relative motion with respect to the obstacle and so on.

In any of the foregoing embodiments, the obstacles can be expressed as polygons for facilitating the computation of the distances between the mobile robot and the obstacles. Where polygonal obstacles are adopted, expressing the sides as vectors interconnected counterclockwise (or clockwise) enables the distances between the sides and the mobile robot to be calculated simply using the outer product or the inner product.

In addition, while the embodiments described above use a viscous drag coefficient, in view of the aforesaid relationship between the velocity and the viscous drag coefficient;

Velocity=Propulsion/Viscous drag coefficient .

it is possible to define a velocity distribution space instead of the viscous drag coefficient distribution. Moreover, since in either case the mobile robot is assumed to overcome the drag by its own propulsion, it is further possible to define the obstacles as exerting a repulsive force on the mobile robot and the goal as exerting an attractive force thereon. This results in a hybrid method falling between the those described above and the potential field method referred to at the beginning of this specification. It is also possible to define the propulsion of the mobile robot as acting to propel the mobile robot away from the obstacles and toward the goal. This results in a hybrid method falling between those described above and the conventional method.

If the size of the mobile robot cannot be ignored in computing the trajectory, it is possible to adopt the frequently used expedient of defining the obstacles larger that actual in order to obtain adequate space for passage of the mobile robot.

While the foregoing embodiments assume that the obstacles are known in advance, this is not limitative and the invention can also be applied to environments including unknown obstacles. In this case, an appropriate viscous drag coefficient distribution is defined at the point in time when an obstacle is recognized and the optimum trajectory is modified accordingly.

In cases such as when unknown obstacles are included, a fresh search for the minimum time trajectory can be conducted each time the mobile robot has moved a certain distance. Doing this enables the trajectory to be modified into one that avoids unexpected stationary and moving obstacles. When an obstacle is slowly approaching from a distance, the newly calculated minimum time trajectory is likely to be similar to the minimum time trajectory up to that time. Since this means that there should be a minimum time trajectory that reaches the goal just a short distance away from the current position, the amount of time required for the search is short.

For preventing sudden direction changes at the time of avoiding unknown stationary or moving obstacles, an elliptical drag coefficient distribution or an anisotropic drag coefficient with low viscous drag in the direction of mobile robot advance and large viscosity in the direction perpendicular thereto can be imparted so as to follow the mobile robot. Further, by modifying the viscous drag in accordance with the velocity of the mobile robot or the trajectory curvature at each instant it becomes possible to obtain an even smoother trajectory.

Moreover, the mobile robot can be presumed to be an unmanned transport vehicle which follows a minimum time trajectory and the trajectory obtained by simulating its behavior with an ordinary unmanned transport vehicle control system can be adopted as the final obstacle-avoiding trajectory. As a result, even if the minimum time trajectory includes extreme behavior, it can be made smooth by causing it to follow the presumed unmanned transport vehicle.

It is also possible to equip the control unit of any of the aforesaid embodiments with a plurality of microcomputers and have them simultaneously conduct a plurality of initial state searches.

In the foregoing embodiments it is further possible to set the viscous drag coefficient at and in the vicinity of the obstacles at about the same low level as at points remote from the obstacles, conduct a search for the minimum time trajectory in this state, and then increase the viscous drag coefficient gradually to the point that the minimum time trajectory avoids the obstacles. In this case, the initial state can be easily found because in the first low level state of the viscous drag coefficient the minimum time trajectory will be nearly a straight line between the starting point and the goal. The probability of the path passing through one or more obstacles will, however, be high. The drag coefficient of the obstacles is therefore increased and the minimum time trajectory is computed again. Since the newly computed trajectory is near the minimum time trajectory just before the drag coefficient was raised, it can be easily found. The drag coefficient distribution of the obstacles is gradually increased by repeating the same procedure until the corresponding minimum time trajectory fully avoids the obstacles.

While the mobile robot in the foregoing embodiments was described as being of the autonomous type, it is not limited to this type but can instead be the actuator of a stationary industrial robot. In this case, the method of the invention is used to find obstacle-avoiding trajectories in a space configured with respect to the actuator joint angles as the spatial axes or to find trajectories that avoid prohibited attitudes that have been predefined as obstacles. The method can also be applied to vehicles of any other type, including rockets, manned vehicles and the like.

The foregoing embodiments relate to examples in which the mobile robot moves along a trajectory that the microcomputer of its control unit computes through comparison with the preferable trajectory characteristics. The invention is not limited to this arrangement, however, and it is alternatively possible to compute the optimum trajectory in advance through virtual simulation or actual experiments and then cause the mobile robot to move along the computed trajectory.

What is claimed is:

1. A system for obstacle avoidance path planning for a multiple-degree-of-freedom mechanism moving from a predetermined point to a goal avoiding an obstacle, comprising:

first means for defining a viscous drag coefficient distribution on the obstacle;

second means for describing a time required for the mechanism to move from the predetermined point to the goal with a functional, using the viscous drag coefficient distribution;

third means for determining a path on the basis of the variational principle with the viscous drag coefficient distribution such that the functional has an extreme value; and fourth means for driving the mechanism along the determined path.

2. A system according to claim 1, wherein said third means includes:

means for establishing a condition for avoiding the obstacle in advance;

and said third means determines the path in accordance with the established condition.

3. A system according to claim 2, wherein the condition is the characteristics of locus and said third means determines the path by comparing it with the characteristics of locus.

4. A system according to claim 1, wherein said first means defines the viscous drag coefficient distribution such that it is largest at the distribution's defined obstacle and continuously decreases with decreasing proximity thereto.

5. A system according to claim 4, wherein said first means defines the viscous drag coefficient distribution on the obstacle which increases with sequential trials of movement.

6. A system according to claim 1, wherein the drag coefficient distribution is also defined on the mechanism and moves with the mechanism.

7. A system according to claim 6, wherein said first means defines the viscous drag coefficient distribution to provide the mechanism with an inertial force.

8. A system according to claim 6, wherein said first means defines the viscous drag coefficient distribution with anisotropy such that a direction of the mechanism's movement is limited.

9. A system according to claim 1, wherein the obstacle is a known-obstacle.

10. A system according to claim 1, wherein the obstacle is expressed in a two-dimensional environment.

11. A system according to claim 1, wherein the obstacle is expressed in a three-dimensional environment.

12. A system according to claim 1, wherein the obstacle is expressed in an environment having a time axis.

13. A system for obstacle avoidance path planning for a multiple-degree-of-freedom mechanism moving from a predetermined point to a goal and avoiding an obstacle, comprising:

first means for defining a viscous drag coefficient distribution on the obstacle and the predetermined point;

second means for describing a time required for the mechanism to move from the predetermined point to the goal with a functional using the viscous drag coefficient distribution;

third means for determining a path on the basis of the variational principle with the viscous drag coefficient distribution such that the functional has an extreme value; and fourth means for driving the mechanism along the determined path.

14. A system according to claim 13, wherein said third means includes:
   means for establishing a condition for avoiding the obstacle in advance;
   and said third means determines the path in accordance with the established condition.

15. A system according to claim 14, wherein the condition is the characteristics of the locus and said second means determines the path by comparing it with the characteristics of the locus.

16. A system according to claim 13, wherein said first means defines the viscous drag coefficient distribution such that it is largest at the distribution's defined obstacle and predetermined point and continuously decreases with decreasing proximity thereto.

17. A system according to claim 16, wherein said first means defines the viscous drag coefficient distribution at least on the obstacle which increases with sequential trials of movement.

18. A system according to claim 13, wherein said first means defines the viscous drag coefficient distribution limiting an initial direction of the mechanism's movement.

19. A system according to claim 13, wherein said first means defines the viscous drag coefficient distribution imparted with anisotropy limiting an initial direction of the mechanism's movement.

20. A system according to claim 13, wherein the obstacle is a known obstacle.

21. A system according to claim 13, wherein the obstacle is expressed in a two-dimensional environment.

22. A system according to claim 13, wherein the obstacle is expressed in a three-dimensional environment.

23. A system according to claim 13, wherein the obstacle is expressed in an environment having a time axis.

24. A system according to claim 13, wherein said first means defines the viscous drag coefficient distribution on the obstacle, the predetermined point and the goal.

25. A system according to claim 13, wherein said first means defines the viscous drag coefficient distribution on the obstacle, the predetermined point, the goal and the mechanism.

* * * * *